US011612166B2

(12) United States Patent
Meerdink et al.

(10) Patent No.: US 11,612,166 B2
(45) Date of Patent: Mar. 28, 2023

(54) CUTTING FORE END FROM HANGING HALF PIG CARCASS

(71) Applicant: MAREL MEAT B.V., Boxmeer (NL)

(72) Inventors: Jan Johannes Meerdink, Ravenstein (NL); Franciscus Theodorus Henricus Johannes Van Der Steen, Megen (NL); Adriaan Ebergen, Lith (NL); Ronald Kranenbarg, 'S-Hertogenbosch (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 17/605,529

(22) PCT Filed: May 1, 2020

(86) PCT No.: PCT/EP2020/062203
§ 371 (c)(1),
(2) Date: Oct. 21, 2021

(87) PCT Pub. No.: WO2020/225154
PCT Pub. Date: Nov. 12, 2020

(65) Prior Publication Data
US 2022/0142187 A1 May 12, 2022

(30) Foreign Application Priority Data
May 3, 2019 (NL) .................................... 2023065

(51) Int. Cl.
*A22C 17/00* (2006.01)
(52) U.S. Cl.
CPC ...... *A22C 17/0086* (2013.01); *A22C 17/0006* (2013.01)

(58) Field of Classification Search
CPC ............ A22C 17/0006; A22C 17/0086; A22B 5/0041; A22B 5/0017; A22B 5/0029
See application file for complete search history.

(56) References Cited

U.S. PATENT DOCUMENTS

| 3,593,369 A | 7/1971 | Anderson et al. |
| 3,916,484 A * | 11/1975 | Kennedy .............. A22B 5/0058 452/159 |
| 5,334,084 A * | 8/1994 | O'Brien ................... A22B 5/20 452/157 |

(Continued)

FOREIGN PATENT DOCUMENTS

| CN | 1121685 A | 5/1996 |
| CN | 102421297 A | 4/2012 |

(Continued)

OTHER PUBLICATIONS

International Search Report and Written Opinion from PCT Application No. PCT/EP2020/062203, dated Jun. 9, 2020.

(Continued)

*Primary Examiner* — Ghassem Alie
*Assistant Examiner* — Samuel A Davies
(74) *Attorney, Agent, or Firm* — Workman Nydegger

(57) ABSTRACT

A system and a method for separating a fore end of a half pig carcass by making a first cut between ribs three and four up to the shoulder blade followed by a second cut through the rest of the carcass. The first cut is made using a regular knife blade, the second cut is made using a scissor blade.

13 Claims, 5 Drawing Sheets

(56) References Cited

U.S. PATENT DOCUMENTS

| | | | |
|---|---|---|---|
| 5,626,515 A | 5/1997 | Krogh | |
| 6,478,667 B2 * | 11/2002 | Bell | G06F 17/148 |
| | | | 452/141 |
| 6,623,348 B1 * | 9/2003 | O'Neill | A22B 5/0041 |
| | | | 452/133 |
| 7,404,759 B2 * | 7/2008 | Sato | A22B 5/0041 |
| | | | 452/157 |
| 9,004,988 B2 | 4/2015 | Van Der Steen et al. | |
| 9,091,673 B2 | 7/2015 | Fern et al. | |
| 9,192,172 B2 | 11/2015 | Van Der Steen et al. | |
| 9,717,257 B2 | 8/2017 | Van Der Steen et al. | |
| 9,913,483 B2 | 3/2018 | Vuholm et al. | |
| 2003/0008608 A1 * | 1/2003 | Scalia | A22C 17/004 |
| | | | 452/157 |
| 2012/0040597 A1 | 2/2012 | Fern et al. | |
| 2012/0295527 A1 * | 11/2012 | Hattori | A22C 17/004 |
| | | | 452/136 |
| 2012/0315834 A1 | 12/2012 | Van Der Steen et al. | |
| 2013/0029574 A1 | 1/2013 | Van Der Steen et al. | |
| 2015/0320058 A1 | 11/2015 | Fern et al. | |
| 2016/0037787 A1 | 2/2016 | Van Der Steen et al. | |
| 2017/0196232 A1 | 7/2017 | Vuholm et al. | |

FOREIGN PATENT DOCUMENTS

| | | |
|---|---|---|
| CN | 102858181 A | 1/2013 |
| CN | 106998710 A | 8/2017 |
| EP | 0985348 A2 | 3/2000 |
| JP | 2006230322 A | 9/2006 |
| JP | WO2007096942 A1 | 7/2009 |
| JP | 2013031916 A | 2/2013 |
| WO | 2007096942 A1 | 8/2007 |

OTHER PUBLICATIONS

Search Report from corresponding NL Application No. 2023065, dated Jan. 30, 2020.
Chinese Search Report from Corresponding Chinese Application No. 202080031879X, dated Mar. 17, 2022.
Chinese Office Action from Corresponding Chinese Application No. 202080031879X, dated Mar. 23, 2022.

* cited by examiner

CUTTING FORE END FROM HANGING HALF PIG CARCASS

FIELD OF THE INVENTION

The present invention relates to the deboning of four-legged slaughter animal carcass parts hanging suspended from carriers of an overhead carcass transport system. More particularly, it relates to the division of the half carcass to separate the fore end from a hanging half carcass.

BACKGROUND OF THE INVENTION

It is known to transport slaughter animal carcass parts hanging suspended from carriers engaging in holes in leg portions of the carcass parts. The carcass parts may be a half carcass that has been eviscerated and cleaned. The carriers used may be of the gambrel type, having two opposed carrier ends pointing away from each other and being tied together with a cross bar. The cross bar has a hanging arrangement that cooperates with an overhead transport conveyor system. Another type of carrier may be the Euro Hook variant, having a pointed end and a carrier portion shaped like a fishing carrier. The Euro Hook also has a hanging arrangement that cooperates with an overhead transport conveyor system similar to that used for gambrels. The single carriers may comply with DIN 5047 (Carriers for meat and other food; tubular track sliding carrier).

Traditionally, a half carcass of a pig is divided into fore end, middle portion and rear end (or ham) before further deboning and other processing. The division into three parts may take place on a processing table, where the half carcass part is lying horizontally, or it may be taking place when the half carcass is still hanging, either stationary or mobile. The cutting itself is done using a saw type rotating blade. This has some perceived disadvantages. First, the generation of an excessive amount of meat and bone dust, which diminishes the quality of the product(s) generated. Second, the cut across the rib portion will cut through ribs and the cut across the shoulder blade will cut a piece of the shoulder blade off leaving sharp bone ends that detract from consumer acceptance. Third, the cut between the ham and middle portion leaves a large amount of high-quality meat on the middle portion because of the straight cut performed by the saw type rotating blade.

The reference JP2013031916 (A) describes that a carcass dividing apparatus has an anterior body dividing section and a posterior body dividing section disposed in series along a rail.

SUMMARY OF THE INVENTION

Embodiments of the invention preferably seeks to mitigate, alleviate or eliminate one or more of the above-mentioned disadvantages singly or in any combination. In particular, it may be seen as an object of embodiments of the present invention to provide a method for processing a half pig carcass part that is at least partly freely hanging from a carrier, where the carrier engages the hind leg of the half pig carcass part.

According to an embodiment there is presented a method of processing a half pig carcass part that is at least partly freely hanging from a carrier, which carrier engages the leg part of the half pig carcass part, comprising:
detecting positions of the ribs of the half pig carcass part, identifying positions of adjacent first and second target ribs, and based on the identified positions,
cutting by a cutting device between the first and second target ribs (thereby creating a rib cut, such as a rib cut between the first and second target ribs, or a rib cut in meat and/or rib cartilage portions between first and second target ribs),
wherein the method further comprises the step of:
separating by a separation device the fore end from the middle part of the half carcass part carcass by cutting through the backbone using the rib cut as a reference.

A possible advantage of the present invention, may be that it renders it easier, requiring less precision in initiating the cut through the spine, faster, more certain to succeed and/or more efficient to get a separation device, such as a scissor knife or a rotating knife or a rotating saw, brought in a position where it can make the cut through the backbone, such as by moving it in a direction towards and through the backbone from the side of the backbone where the rib cut is present. A possible reason for this being that a relatively big split of the carcass between the ribs (due to gravity pulling in the half pig carcass part that is at least partly freely hanging from a carrier, which carrier engages the leg part of the half pig carcass part) is created, which in turn in effect creates a target for the separation device (such as enabling utilizing a cut in the first step, such as the resulting rib cut, as a landmark in the second step), which may render cutting through the spine easier, requiring less precision in initiating the cut through the spine, faster, more certain to succeed and/or more efficient compared to, e.g., cutting from the back (spine) side of the carcass and/or cutting with the separation device from the front (rib) side prior to cutting by a cutting device between the first and second target ribs.

According to an alternative aspect a method may have the steps of:
detecting at least one characteristic property of the half pig carcass part including positions of the ribs of the half pig carcass part,
identifying positions of adjacent first and second target ribs, and based on the identified positions,
cutting by a cutting device between the first and a second target ribs.

A better yield and better consistency in the resulting products is realized using this method and there is less smearing in the cut and no sharp edges in the resulting products (ribs). This is because it is possible to smoothly cut up to the backbone of the half carcass part, instead of using e.g. a saw. Thus, a better yield and better appearing end products are the result.

It may be understood, such as within an embodiment, that cutting by a cutting device between the first and second target ribs creates a rib cut, such as a rib cut between the first and the second target ribs, or a rib cut in meat and/or rib cartilage portions between the first and the second target ribs.

The adjacent first and a second target ribs may comprise third and fourth ribs, wherein the cut is performed up to a tip of the shoulder blade, the cut causing a fore end portion to be partly separated from the remaining ribs of the half pig carcass part via gravity. A possible advantage of this may be that the shoulder blade may function as and be utilized as a natural stop for the cutting and/or the cutting device.

Alternatively, the adjacent first and a second target ribs comprise fourth and fifth ribs the cut causing a fore end portion to be partly separated from the remaining ribs of the half pig carcass part via gravity.

In one embodiment, the step of detecting positions of the ribs of the half pig carcass part may be performed by a detection apparatus.

In one embodiment, the step of detecting at least one characteristic property of a half pig carcass part including positions of the ribs of the half pig carcass part may be performed by a detection apparatus.

In an embodiment, the detection apparatus includes one or more of the following:

a laser scanner for scanning and generating a three-dimensional image data of one and/or both sides of the half pig carcass part, a digital imaging device for capturing three-dimensional image data of one and/or both sides of the half pig carcass part, and an X-ray apparatus for capturing X-ray data indicating inner bone structure of the half pig carcass part including the positions of the ribs of the half pig carcass part.

The method may further include processing detected data using a processing unit connected to the detection apparatus to determine the positions of the first and second target ribs.

The method may further comprise operating the cutting device by the processing unit to automatically cut the cartilage portion between the first and a second target ribs.

Alternatively, one or more of the cuts may be performed manually, by an operator located at a suitable position relative the half carcass.

The method may comprise operating the separating device by the processing unit to automatically cut the fore end from the middle part of the half carcass part carcass by cutting through the backbone using the rib cut as a reference.

In an embodiment, the separation device may comprise a scissor knife or a saw.

In a second aspect of the invention an apparatus is provided for processing a half pig carcass part that is at least partly freely hanging from a carrier, which carrier engages the leg part of the half pig carcass part, comprising: a detection unit for detecting positions of the ribs of the half pig carcass part, an identification device for identifying positions of adjacent first and a second target ribs, a cutting device for cutting based on the identified positions between the first and second target ribs, the cut causing a fore end portion to be partly separated from the remaining ribs of the half pig carcass part via gravity, and a separation device for separating the fore end from the middle part of the half carcass part carcass by cutting through the backbone using the rib cut as a reference.

'Detection unit' may be understood so as to be interchangeable with 'detection apparatus' within the present application, where 'detection apparatus' is different from (such as a sub-unit of) the 'apparatus is provided an apparatus for processing a half pig carcass part that is at least partly freely hanging from a carrier'.

According to an alternative aspect, an apparatus is provided for processing a half pig carcass part that is at least partly freely hanging from a carrier, which carrier engages the leg part of the half pig carcass part, comprising: a detection unit for detecting at least one characteristic property of the half pig carcass part including positions of the ribs of the half pig carcass part, an identification device for identifying positions of first and second target ribs, and based on the identified positions, a cutting device for cutting between the first and second target ribs, the cut causing a fore end portion to be partly separated from the remaining ribs of the half pig carcass part via gravity.

The cutting device may comprise any type of cutting blade that may in one embodiment be attached to a robotic arm for performing the cut up to the shoulder blade fully automatically.

According to an embodiment, the cutting device comprises a robotic arm for performing the cut up to the shoulder blade fully automatically.

According to an embodiment, the separation device comprises a robotic arm for performing fully automatically the separation of the fore end from the middle part of the half carcass part carcass by cutting through the backbone using the rib cut as a reference.

This cut may also be semi manual or fully manual, where e.g. an operator may be informed, e.g. via a reference marker, where to start the cut.

The cutting device may further comprise a scissor cut for fully separating the fore end portion from the rest of the pig half carcass.

According to an embodiment, said cutting by a cutting device between the first and second target ribs creates a rib cut, such as a rib cut between the first and the second target ribs, such as a rib cut in meat and/or rib cartilage portions between the first and the second target ribs.

Accordingly, a method and an apparatus is provided that, among other things, allows full automation of separating a hanging half carcass into fore end, middle portion and ham. Further, the yield of each part is optimized by allowing precise cuts along muscle contours or along ribs, even when performing the method at least partly manually.

BRIEF DESCRIPTION OF THE DRAWINGS

Embodiments of the invention will be described, by way of example only, with reference to the drawings, in which.

DESCRIPTION OF EMBODIMENTS

Figure 1:
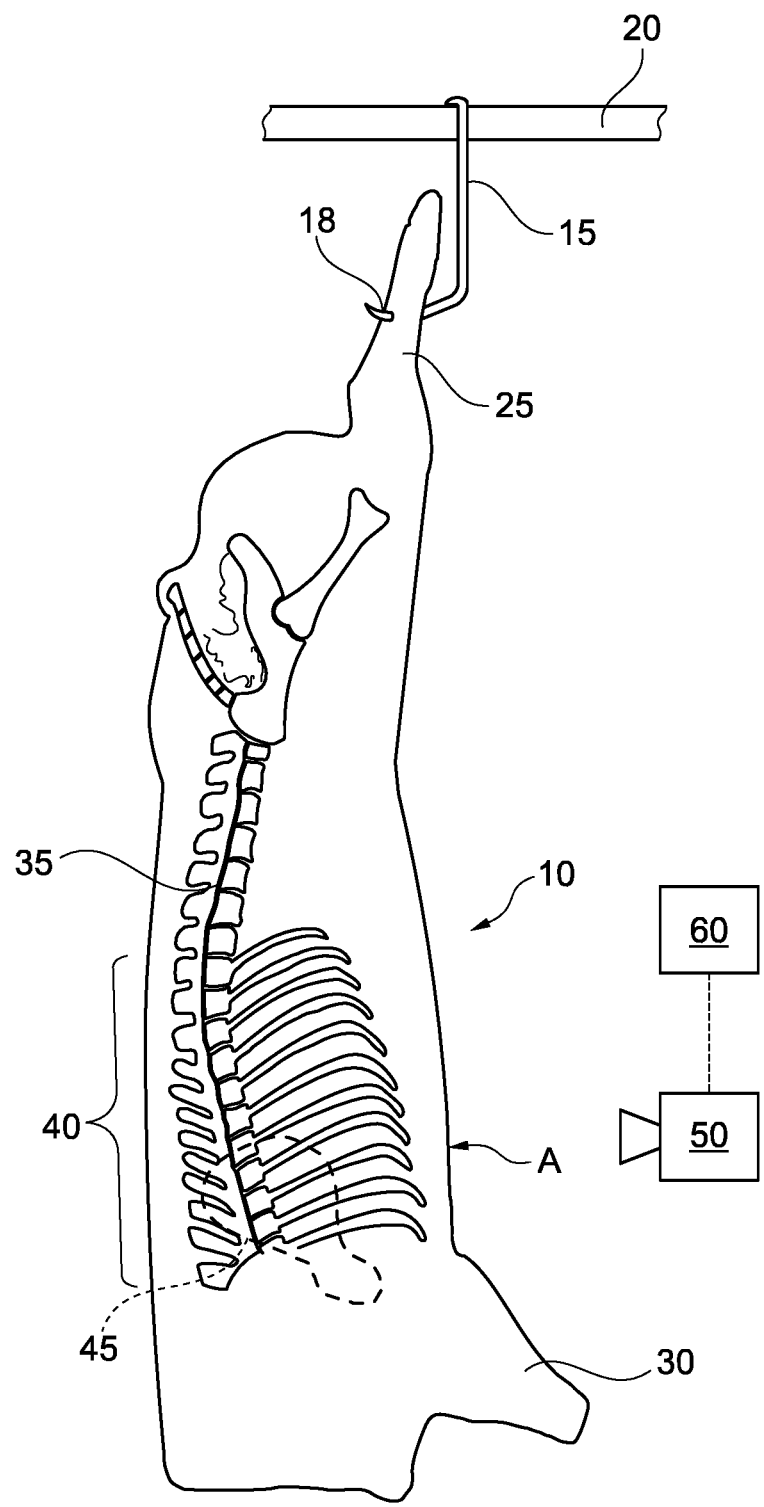
FIG. 1 is a schematic side view showing a half carcass hanging from an overhead transfer system according to an embodiment of the invention.

Referring to FIG. 1, a pig half carcass 10, that advantageously has been eviscerated and cleaned, is hanging from a carrier 15 of an overhead transport system 20. The transport system is depicted as a simple single hook conveyor system but may be any type of overhead transport system suitable of carrying and transporting a pig half carcass, utilizing any type of suitable carrier. There are several suitable known transport systems that may be used well known to a person skilled in the art.

The half carcass 10 is hanging from the carrier 15 via a hole 18 in a hind leg 25 of the carcass. The half carcass has a foreleg 30 that is hanging freely. The half carcass has a spine portion 35, which is visible after the splitting of the whole carcass along the spine in an earlier operation (not shown). Further, a number of ribs are visible in the rib region 40.

To begin processing the half carcass part, at least one characteristic property of the half pig carcass 10 is detected, e.g. using a detection apparatus 50. The detection apparatus 50 may include one or more of the following:

a laser scanner for scanning and generating a three-dimensional image data of one and/or both sides of the half pig carcass 10, a digital imaging device for capturing three-dimensional image data of one and/or both sides of the half pig carcass 10, and an X-ray apparatus for capturing X-ray data indicating inner bone structure of the half pig carcass 10 including the positions of the ribs of the half pig carcass.

The resulting data, e.g. the X-ray data, is then processed by a control processing unit 60 for determining a reference point A, which as shown here is situated on the edge of the pig adjacent the ribs, thus not adjacent the spine. As shown, the shoulder blade 45 is embedded in the muscle mass of the pig adjacent the spine and the first four ribs and is marked with a dotted line.

Based on the identified positions, the reference point A is located and either the position is stored in memory of the control processing unit 60 or the position is marked directly on the pig carcass. Marking may be done using a visible light beam (not shown) or edible dye (or any other form of indication) to inform e.g. an operator of where to begin the first cut, or an automatic cutting device 70 that may perform this cut between ribs 3 and 4 automatically e.g. using a robot arm.

Figure 2:
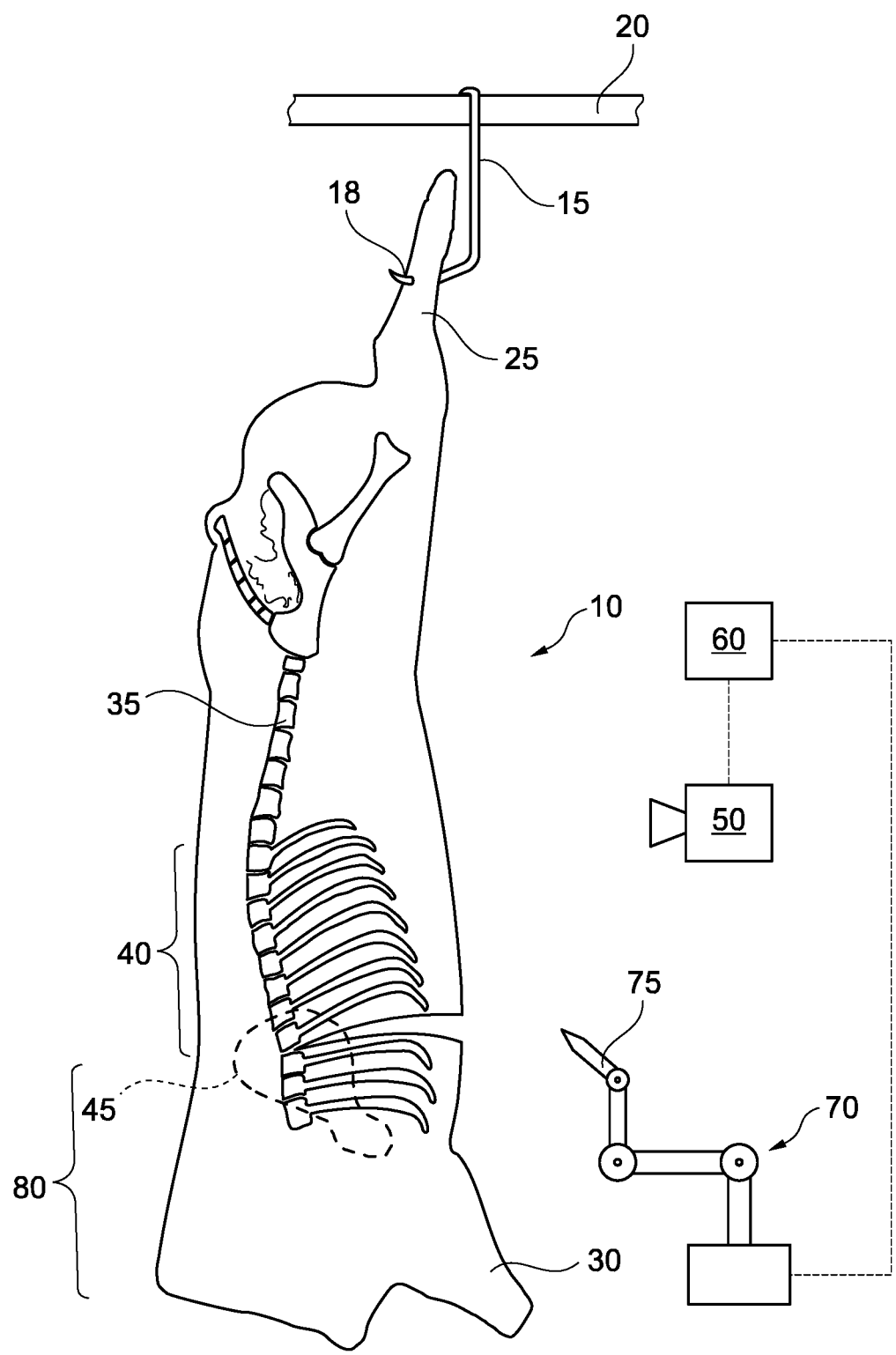
FIG. 2 is a schematic side view showing the half carcass after the first cut has been made at the reference point between $3^{rd}$ and $4^{th}$ ribs.

The first cut is thus made by the cutting device 70, comprising a cutting blade 75, where the cutting blade 75 is configured to cut through a rib cartilage portion between the third and fourth ribs (or fourth and fifth) up to the shoulder blade 45. The cut causes a fore end portion 80 including first to third (or fourth) ribs to be partly separated from the remaining ribs of the half pig carcass 10 via gravity. FIG. 2 shows the situation after the first cut has been made.

Figure 3A:
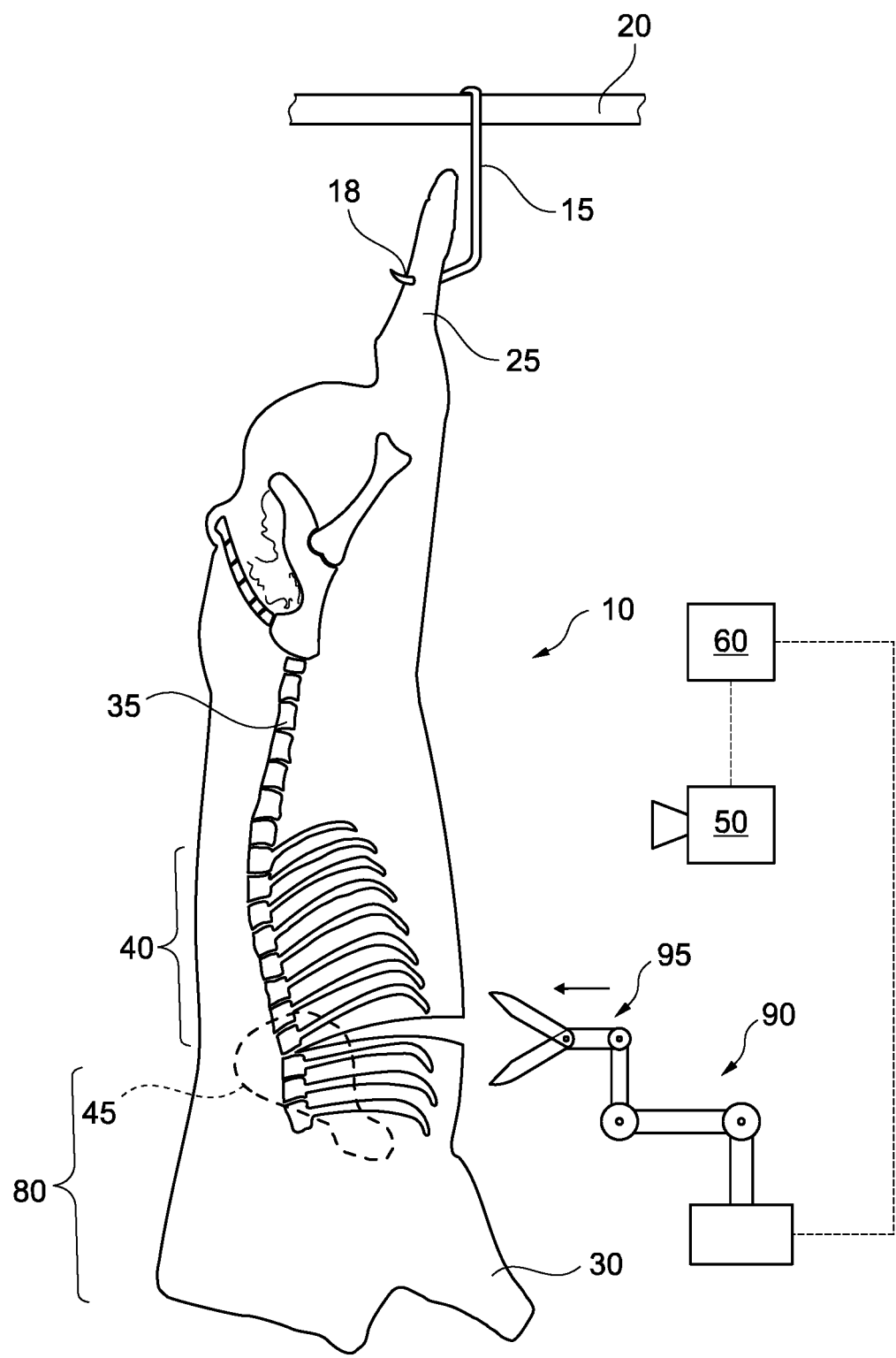
FIGS. 3a and 3b are a schematic side view showing the half carcass after the first cut and preparing for the second cut.
Figure 3B:
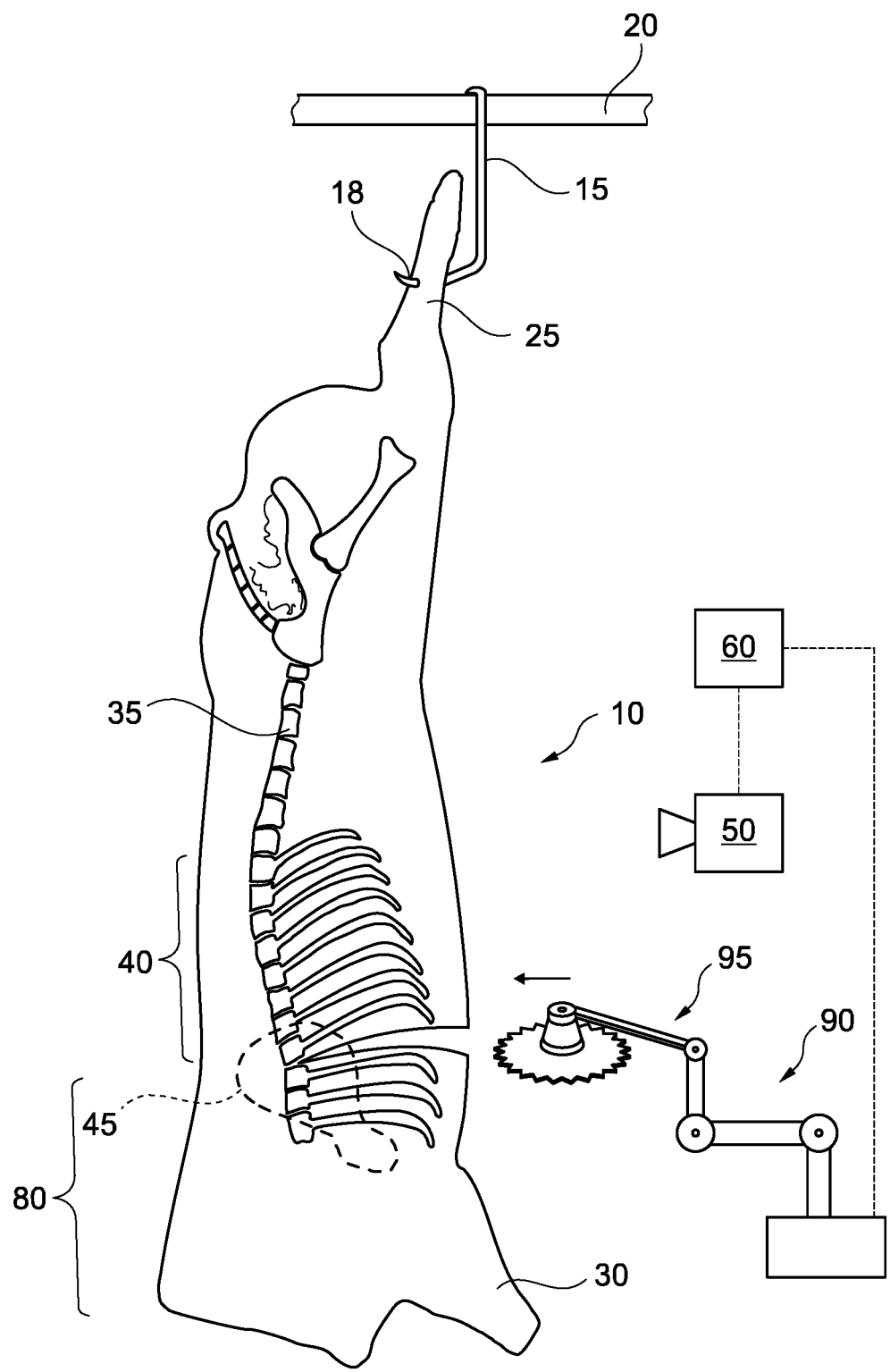

Thereafter, as shown in FIGS. 3a and 3b, a separation device 90 carrying a separation blade 95 makes a second cut to separate the carcass connection between the fourth (or fifth) rib and the shoulder blade and further across the spine 35 of the half pig carcass part and to a back of the half pig carcass part to separate the fore end portion 80 from the rest of the half pig carcass 10 using the first cut as a reference. The shoulder blade includes cartilage (moon bone), using the method according to the invention, when making the second cut it is avoided to cut either the shoulder blade or the cartilage.

The separation blade 95 may be a scissor knife, or any other cutting tool that makes a clean cut through the carcass without leaving meat and bone dust, for instance. It is possible to use one articulated robot arm for both the cutting device 70 as well as the separation device 90. The robot arm would change tool from the initial cutting blade 75, for the first cut, to the subsequent separation blade 95, for the second cut, and then back for the next cycle.

Figure 4:
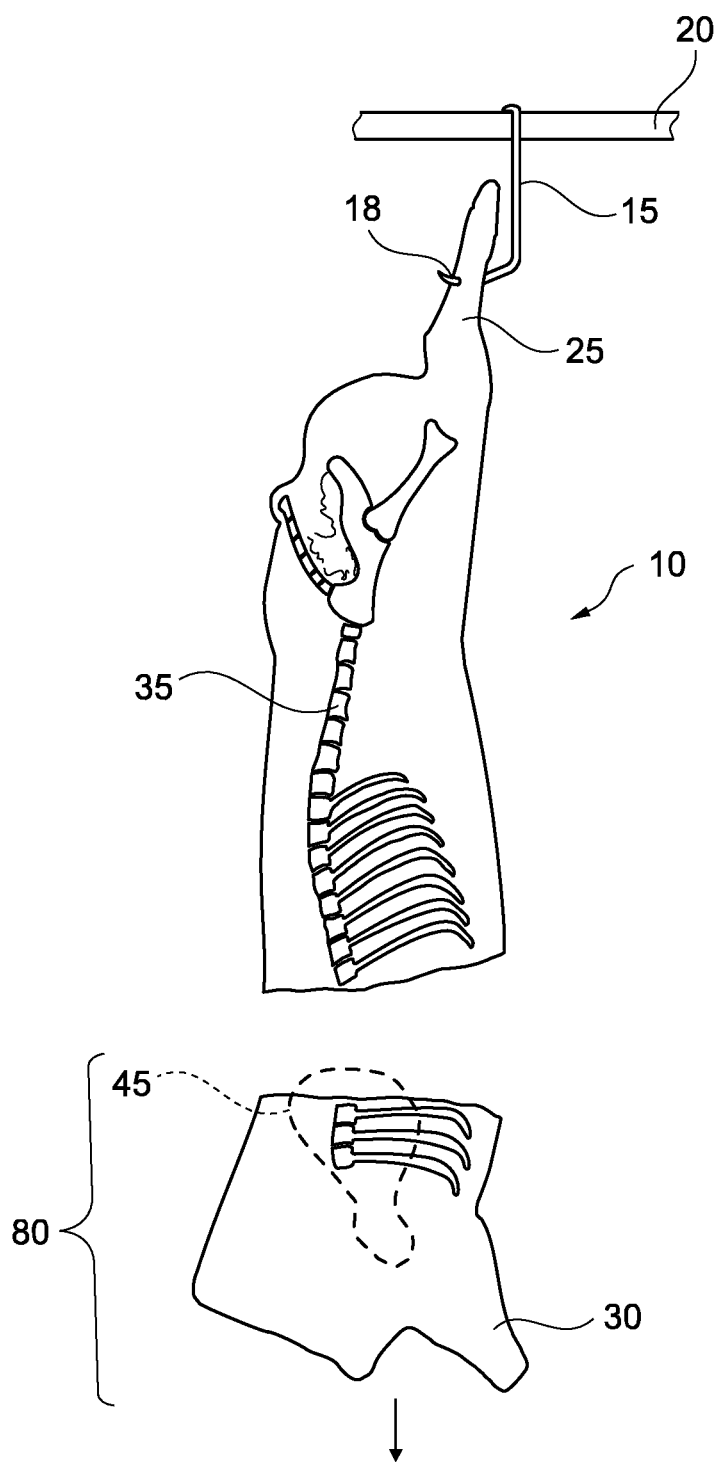
FIG. 4 is a schematic side view showing the half carcass after the second cut has been made and the fore end is separated from the rest of the carcass.

FIG. 4 finally shows the situation when the fore end portion 80 has been fully separated from the rest of the pig half carcass 10 and is falling to a collection device (not shown) for further processing.

The above description of possible embodiments of the present invention should not be interpreted as limiting the scope of the present invention. Factors such as cost, mechanical stability and weight of components will dictate what solution is chosen for each case.

There is furthermore presented a method of processing a half pig carcass part that is at least partly freely hanging from a carrier and an apparatus for processing a half pig carcass part that is at least partly freely hanging from a carrier according to the limitations below, which limitations may be combined with any of the preceding limitations and/or any of the appended limitations:

A method of processing a half pig carcass part that is at least partly freely hanging from a carrier, which carrier engages the leg part of the half pig carcass part, comprising:

detecting at least one characteristic property of the half pig carcass part including positions of the ribs of the half pig carcass part, identifying positions of adjacent first and second target ribs, and based on the identified positions, cutting by a cutting device between the first and a second target ribs.

The method wherein the adjacent first and second target ribs comprise third and fourth ribs, wherein the cut is performed up to a tip of the shoulder blade, the cut causing a fore end portion to be partly separated from the remaining ribs of the half pig carcass part via gravity.

The method wherein the adjacent first and second target ribs comprise fourth and fifth ribs the cut causing a fore end portion to be partly separated from the remaining ribs of the half pig carcass part via gravity.

The method wherein the method further comprises the step of:

separating by a separation device the fore end from the middle part of the half carcass part carcass by cutting through the backbone using the rib cut as a reference.

The method wherein the detecting at least one characteristic property of a half pig carcass part including positions of the ribs of the half pig carcass part is performed by a detection apparatus.

The method wherein the detection apparatus includes one or more of the following:

a laser scanner for scanning and generating a three-dimensional image data of one and/or both sides of the half pig carcass part, a digital imaging device for capturing three-dimensional image data of one and/or both sides of the half pig carcass part, and an X-ray apparatus for capturing X-ray data indicating inner bone structure of the half pig carcass part including the positions of the ribs and the shoulder blade of the half pig carcass part.

The method further comprising processing detected data using a processing unit connected to the detection apparatus to determine the positions of the first and a second target ribs.

The method further comprising operating the cutting device by the processing unit to automatically cut between the first and a second target ribs.

The method further comprising operating the separating device by the processing unit to automatically cut the fore end from the middle part of the half carcass part carcass by cutting through the backbone using the rib cut as a reference.

The method wherein the separation device is selected from one or more of:

a scissor knife, or a saw.

An apparatus for processing a half pig carcass part that is at least partly freely hanging from a carrier, which carrier engages the leg part of the half pig carcass part, comprising:

a detection unit for detecting at least one characteristic property of the half pig carcass part including positions of the ribs of the half pig carcass part, an identification device for identifying positions of adjacent first and a second target ribs, and based on the identified positions, a cutting device for cutting by a cutting device between the first and a second target ribs, the cut causing a fore end portion to be partly separated from the remaining ribs of the half pig carcass part via gravity.

The invention claimed is:

1. A method of processing a half pig carcass part that is hanging from a carrier of an overhead transport system, wherein the carrier engages a leg part of the half pig carcass part, comprising:
  detecting positions of ribs of the half pig carcass part,
  identifying positions of adjacent first and second target ribs, and based on the identified positions,
  cutting by a cutting device between the first and second target ribs to create a rib cut in meat or cartilage portions between the first and second target ribs,
  wherein the cutting device comprises a cutting blade for performing the rib cut between the first and second target ribs,
  wherein the rib cut causes a fore end portion of the half pig carcass part to be partly separated from a middle part of the half pig carcass part via gravity;
  wherein the method further comprises the step of:
  separating by a separation device the fore end portion of the half pig carcass part from the middle part of the half pig carcass part by cutting through a backbone of the half pig carcass part using the rib cut as a reference,
  wherein the separation device comprises a separating blade and a robotic arm attached to the separating blade for fully automatically performing the separating of the fore end portion from the middle part of the half pig carcass part.

2. The method according to claim 1, wherein the adjacent first and second target ribs comprise the third and fourth ribs of the half pig carcass part.

3. The method according to claim 1, wherein the adjacent first and second target ribs comprise the fourth and fifth ribs of the half pig carcass part.

4. The method according to claim 1, wherein the detecting positions of the ribs of the half pig carcass part is performed by a detection apparatus.

5. The method according to claim 4, wherein the detection apparatus includes one or more of the following:
  a laser scanner for scanning and generating three-dimensional image data of one and/or both sides of the half pig carcass part,
  a digital imaging device for capturing three-dimensional image data of one and/or both sides of the half pig carcass part, and
  an X-ray apparatus for capturing X-ray data indicating inner bone structure of the half pig carcass part including the positions of the ribs and shoulder blade of the half pig carcass part.

6. The method according to claim 4, further comprising processing detected data using a control processing unit connected to the detection apparatus to identify the positions of the first and second target ribs.

7. The method according to claim 6, further comprising operating the cutting device by the control processing unit to automatically cut between the first and second target ribs.

8. The method according to claim 1, further comprising operating the separation device by a control processing unit to automatically cut the fore end portion of the half pig carcass part from the middle part of the half pig carcass part by cutting through the backbone of the half pig carcass part using the rib cut as a reference.

9. The method according to claim 1, wherein the separation device is selected from one or more of:
  a scissor knife,
  a rotating knife, or
  a rotating saw.

10. An apparatus for processing a half pig carcass part that is at least partly freely hanging from a carrier, wherein the carrier engages a leg part of the half pig carcass part, comprising:
  a detection unit for detecting positions of ribs of the half pig carcass part,
  a control processing unit connected to the detection unit, the control processing unit configured to process data related to the detected positions of the ribs of the half pig carcass part for identifying positions of adjacent first and second target ribs and storing the identified positions of the adjacent first and second target ribs,
  a cutting device for cutting based on the identified positions between the first and second target ribs to create a rib cut in meat or cartilage portions between the first and second target ribs, the rib cut causing a fore end portion of the half pig carcass to be partly separated from a middle part of the half pig carcass part via gravity, and
  a separation device for separating the fore end portion of the half pig carcass part from the middle part of the half pig carcass part by cutting through a backbone of the half pig carcass part using the rib cut as a reference,
  wherein the cutting device comprises a cutting blade and a first robotic arm attached to the cutting blade for fully automatically performing the rib cut between the first and second target ribs,
  wherein the separation device comprises a separating blade and a second robotic arm attached to the separating blade for fully automatically performing the separating of the fore end portion from the middle part of the half pig carcass part.

11. The apparatus according to claim 10, wherein said cutting by the cutting device between the first and second target ribs creates the rib cut between the first and the second target ribs, wherein the rib cut is created in meat and/or rib cartilage portions between the first and the second target ribs.

12. The apparatus according to claim 10, wherein the detection unit includes one or more of the following:
  a laser scanner for scanning and generating three-dimensional image data of one and/or both sides of the half pig carcass part,
  a digital imaging device for capturing three-dimensional image data of one and/or both sides of the half pig carcass part, and
  an X-ray apparatus for capturing X-ray data indicating inner bone structure of the half pig carcass part including the positions of the ribs and shoulder blade of the half pig carcass part.

13. An apparatus for processing a half pig carcass part that is at least partly freely hanging from a carrier, wherein the carrier engages a leg part of the half pig carcass part, comprising:
  a detection unit for detecting positions of ribs of the half pig carcass part,
  a control processing unit connected to the detection unit, the control processing unit configured to process data related to the detected positions of the ribs of the half pig carcass part for identifying positions of adjacent first and second target ribs and storing the identified positions of the adjacent first and second target ribs,
  a robot arm comprising first and second interchangeable tools, wherein the first interchangeable tool is a cutting device for creating a rib cut in meat or cartilage portions between the first and second target ribs based on the identified positions between the first and second target ribs, the rib cut causing a fore end portion of the half pig carcass part to be partly separated from a middle part of the half pig carcass part via gravity, wherein the second interchangeable tool is a separation device for separating the fore end portion of the half pig carcass part from the middle part of the half pig carcass part by cutting through a backbone of the half pig carcass part using the rib cut as a reference, and wherein the first interchangeable tool comprises a cutting blade for fully automatically performing the rib cut between first and second target ribs, and wherein the second interchangeable tool comprises a separating blade for fully automatically performing the separating of the fore end portion from the middle part of the half pig carcass part.

\* \* \* \* \*